US012387540B2

(12) United States Patent
Macdonald et al.

(10) Patent No.: US 12,387,540 B2
(45) Date of Patent: Aug. 12, 2025

(54) VEHICLE AND DEVICE TRIP CORRELATION

(71) Applicant: GM GLOBAL TECHNOLOGY OPERATIONS LLC, Detroit, MI (US)

(72) Inventors: Gregory Gerald Macdonald, Oxford, MI (US); James Scott MacGuidwin, Northville, MI (US); Daniel E Rudman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 18/363,711

(22) Filed: Aug. 1, 2023

(65) Prior Publication Data

US 2025/0046133 A1 Feb. 6, 2025

(51) Int. Cl.
*G07C 5/08* (2006.01)
*G07C 5/00* (2006.01)

(52) U.S. Cl.
CPC ........... *G07C 5/0841* (2013.01); *G07C 5/008* (2013.01)

(58) Field of Classification Search
CPC .............................. G07C 5/0841; G07C 5/008
See application file for complete search history.

(56) References Cited

U.S. PATENT DOCUMENTS

2020/0079397 A1* 3/2020 Harichandan ......... H04W 4/024

FOREIGN PATENT DOCUMENTS

DE 102021100584 A1 7/2021
DE 102020205210 A1 10/2021
DE 102022001252 A1 6/2022

* cited by examiner

*Primary Examiner* — Rodney A Butler
(74) *Attorney, Agent, or Firm* — Ingrassia Fisher & Lorenz, LLP

(57) ABSTRACT

Methods and systems are provided for correlating mobile platform data with secondary device data. In an exemplary embodiment, mobile platform data and secondary device data are obtained. The mobile platform data pertains to a mobile platform. The secondary device data originates from a secondary device that is movably disposed within the mobile platform at certain times. The obtaining of the secondary device data is independent from the obtaining of the mobile platform data. The mobile platform data is correlated with the secondary device data, via a processor.

20 Claims, 9 Drawing Sheets

VEHICLE AND DEVICE TRIP CORRELATION

TECHNICAL FIELD

The technical field generally relates to mobile platforms including vehicles and other platforms and, more specifically, to systems and methods for correlating data from mobile platforms with data from secondary devices that may be temporarily disposed inside mobile platforms.

BACKGROUND

Mobile platforms today, such as vehicles, often collect data, for example as to mobile platform acceleration, speed, braking, turning, and other events. Secondary devices (such as a user's mobile phone) may also collect data pertaining to mobile platforms, including while inside the mobile platform. However, existing systems and methods may not in various situations provide optimal correlation of such data of mobile platforms with data of devices.

Accordingly, it is desirable to provide improved methods and systems for correlating mobile platform data with secondary device data. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining mobile platform data, the mobile platform data pertaining to a mobile platform; obtaining secondary device data, the secondary device data originating from a secondary device that is movably disposed within the mobile platform at certain times, wherein the obtaining of the secondary device data is independent from the obtaining of the mobile platform data; and correlating the mobile platform data with the secondary device data, via a processor.

Also in an exemplary embodiment, the mobile platform data originates from one or more sensors that are built into the mobile platform.

Also in an exemplary embodiment, the mobile platform data originates from one or more additional devices that are configured to detect mobile platform events, collect sensor data during operation of the mobile platform, or both.

Also in an exemplary embodiment, the step of correlating the mobile platform data with the secondary device data includes generating, via the processor, a mobile platform event space for the mobile platform data; generating, via the processor, a secondary device event space for the secondary device data; and performing, via the processor, a cross-correlation between the mobile platform event space and the secondary device event space.

Also in an exemplary embodiment, the method further includes applying, via the processor, a preliminary limitation on a search space for the mobile platform event space and the secondary device event space prior to performing the cross-correlation.

Also in an exemplary embodiment, the step of performing the cross-correlation includes performing, via the processor, a DSP convolution with respect to the secondary device event space, generating a filtered secondary device event space; and performing, via the processor, a DSP cross-correlation between the mobile platform event space and the filtered secondary device event space.

Also in an exemplary embodiment, the method further includes assigning, via the processor, a probabilistic assignment matrix between the mobile platform data and the secondary device data based on the cross-correlation.

In another exemplary embodiment, a system is provided that includes a non-transitory computer readable storage medium and a processor. The non-transitory computer readable storage medium is configured to store mobile platform data, the mobile platform data pertaining to a mobile platform; and secondary device data, the secondary device data originating from a secondary device that is movably disposed within the mobile platform at certain times, wherein the mobile platform data was obtained separately from the secondary device data. The processor is coupled to the transceiver, and is configured to at least facilitate correlating the mobile platform data with the secondary device data.

Also in an exemplary embodiment, the mobile platform data originates from one or more sensors that are built into the mobile platform.

Also in an exemplary embodiment, the mobile platform data originates from one or more additional devices that are configured to detect mobile platform events, collect sensor data during operation of the mobile platform, or both.

Also in an exemplary embodiment, the processor is further configured to at least facilitate correlating the mobile platform data with the secondary device data without any prior association between the mobile platform and the secondary device.

Also in an exemplary embodiment, the processor is further configured to at least facilitate generating, a mobile platform event space for the mobile platform data; generating a secondary device event space for the secondary device data; and performing a cross-correlation between the mobile platform event space and the secondary device event space.

Also in an exemplary embodiment, the processor is further configured to at least facilitate applying a preliminary limitation on a search space for the mobile platform event space and the secondary device event space prior to performing the cross-correlation.

Also in an exemplary embodiment, the processor is further configured to at least facilitate performing a DSP convolution with respect to the secondary device event space, generating a filtered secondary device event space; and performing a DSP cross-correlation between the mobile platform event space and the filtered secondary device event space.

Also in an exemplary embodiment, the processor is further configured to at least facilitate assigning a probabilistic assignment matrix between the mobile platform data and the secondary device data based on the cross-correlation.

In another exemplary embodiment, a system is provided that includes a transceiver, a non-transitory computer readable storage medium, and a processor. The transceiver is configured to at least facilitate obtaining mobile platform data pertaining to a mobile platform; and obtaining secondary device data from a secondary device that is remote from the system and that is movably disposed within the mobile platform at certain times, wherein the obtaining of the secondary device data is independent from the obtaining of the mobile platform data. The non-transitory computer readable storage medium is configured to store a program along with the mobile platform data and the secondary device data. The processor is coupled to both the transceiver and the non-transitory computer readable storage medium, and is configured to execute the program and, in accordance with the program, to at least facilitate correlating the mobile platform data with the secondary device data.

Also in an exemplary embodiment, the mobile platform data originates from one or more sensors that are built into the mobile platform.

Also in an exemplary embodiment, the mobile platform data originates from one or more additional devices that are configured to detect mobile platform events, collect sensor data during operation of the mobile platform, or both.

Also in an exemplary embodiment, the processor is further configured to at least facilitate, in accordance with the program: generating, a mobile platform event space for the mobile platform data; generating a secondary device event space for the secondary device data; and performing a cross-correlation between the mobile platform event space and the secondary device event space.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
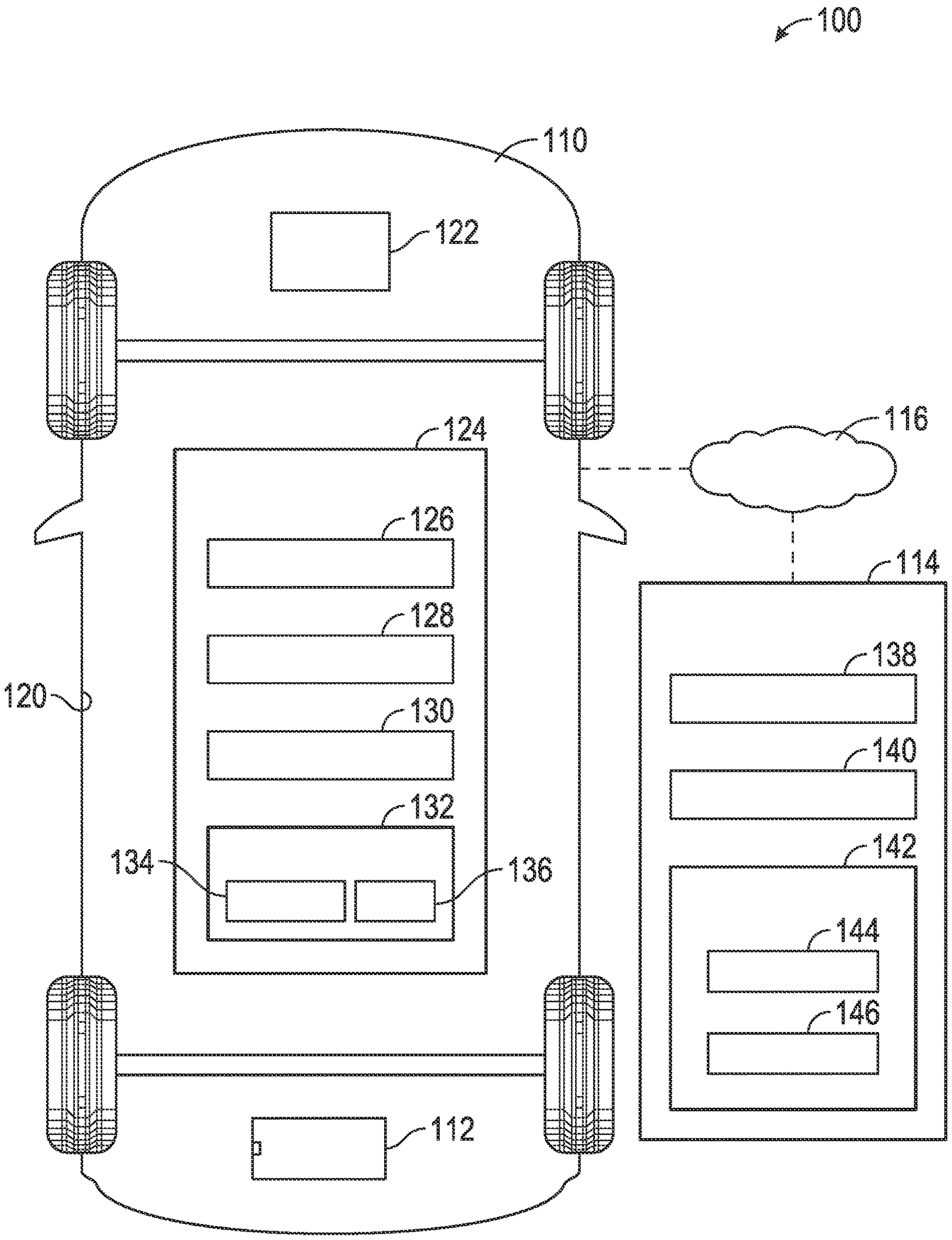
FIG. 1 is a diagram of a system that includes a mobile platform, such as a vehicle, along with a secondary device inside the mobile platform, and a remote server that correlates data obtained from the mobile platform with data obtained from the secondary device, in accordance with exemplary embodiments.

FIG. 1 is a diagram of a system 100 that is configured for correlating data from mobile platforms with data from secondary devices that are disposed inside mobile platforms, in accordance with exemplary embodiments. Specifically, FIG. 1 depicts a representative mobile platform 110, a representative secondary device 112, a remote server 114, and one or more wireless communications networks 116, in accordance with exemplary embodiments.

In certain embodiments, as depicted in FIG. 1, the mobile platform 110 comprises a vehicle. In certain embodiments, the mobile platform 110 may be any one of a number of different types of automobiles, such as, for example, a sedan, a wagon, a truck, or a sport utility mobile platform (SUV), and may be two-wheel drive (2WD) (i.e., rear-wheel drive or front-wheel drive), four-wheel drive (4WD) or all-wheel drive (AWD), and/or various other types of vehicles and/or other types of mobile platforms in certain embodiments. In certain embodiments, the mobile platform 110 may also comprise a motorcycle or other mobile platform, such as aircraft, spacecraft, watercraft, scooter, bicycle, skateboard, hoverboard, gyro-based transportation devices, other transportation devices, and so on, and/or one or more other types of vehicles and/or other types of mobile platforms (e.g., a robot and/or other mobile platform). Also in various embodiments, as used throughout this Application, the term "mobile platform" may refer to a mobile platform itself, or a component thereof, or a device capable of detecting trip related events or collecting sensor data relating movement of the mobile platform. For example, and without limitation, throughout this Application, with respect to references to a "mobile platform", "data" from the mobile platform, and so on, such references may refer to the mobile platform itself or to one or more such components or devices capable of detecting trip related events or collecting sensor data relating to movement of the mobile platform. Accordingly, as described throughout this Application and as depicted in the Figures, the correlation of data between the mobile platform and data of secondary devices may refer to (a) correlation of data between the mobile platform itself with data between secondary devices (such as smart phones, tablets, smart watches, other wearable devices, and so on that are disposed inside one or more mobile platforms); and/or (b) correlation of data between one such secondary device with data of one or more other such secondary devices, and so on, among other possible combinations.

Also in various embodiments, the mobile platform 110 comprises a representative one of a number of different mobile platforms. In various embodiments, the mobile platform 110 belongs to a fleet of mobile platforms (e.g., a fleet of vehicles, in certain embodiments), and/or to another group or set of mobile platforms from which data is collected.

With continued reference to FIG. 1, in certain embodiments the mobile platform 110 includes a body 120, a drive system 122, and a control system 124. Also as depicted in FIG. 1, in various embodiments the mobile platform 110 also includes one or more secondary devices 112 (e.g., belonging to a user of the mobile platform 110) disposed inside the mobile platform 110 and/or otherwise coupled to the mobile platform 110.

In various embodiments, the drive system 122 is disposed within the body 120, and provides for movement of the mobile platform 110.

In various embodiments, the control system 124 is also disposed within the body 120, and controls operation of the mobile platform 110. In various embodiments, the control system 124 controls movement of the mobile platform 110 in accordance with instructions provided to the drive system 122 and/or other mobile platform systems. Also in various embodiments, the control system 124 controls the obtaining of data from the mobile platform 110 and the transmission of the mobile platform data to the remote server 114 for processing.

As depicted in FIG. 1, in various embodiments the control system 124 includes sensors 126, a transceiver 128, a processor 130, and a memory 132.

In various embodiments, the sensors 126 obtain sensor data as to operation of the mobile platform 110, such as speed, acceleration, deceleration, braking, turning, and mobile platform events. For example, in various embodiments, the sensors 126 include various location sensors (e.g., global positioning system, or "GPS" sensors), accelerometers, gyroscopes, speed sensors (e.g., wheel speed sensors), braking sensors (e.g., coupled to a brake pedal and/or braking system of the mobile platform 110), steering sensors (e.g., steering angle sensors coupled to a steering wheel or steering column of the mobile platform 110), and/or other sensors configured to collect sensor data from the mobile platform 110. In various embodiments, the sensors 126 are built into the mobile platform 110 (e.g., during manufacturing of the mobile platform 110), and are permanently disposed within or otherwise onboard the mobile platform 110 (e.g., on or within the body 120 of the mobile platform 110). In various embodiments, the sensors 126 are configured to obtain sensor data that can be used in detecting or determining the occurrence of various mobile platform events such as hard braking, hard acceleration, hard turn, speed transition, other speed and acceleration events, mobile platform contact events, and so on.

With continued reference to FIG. 1, in various embodiments, the transceiver 128 is utilized to communicate via one or more wireless communications networks 116 with the remote server 114 and/or with one or more other remote entities. In various embodiments, the transceiver 128 transmits the sensor data from the sensors 126 (and, in certain embodiments, determinations as to mobile platform events therefrom) to the remote server 114 for processing, and specifically for correlating with data obtained from the secondary device 112. In certain embodiments, the transceiver 128 may also transmit other mobile platform data (e.g., form one or more of the secondary devices 112 onboard the mobile platform 110).

Also in various embodiments, the processor 130 performs the computation and control functions of the control system 124 and for the mobile platform 110, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 134 contained within the memory 132 and, as such, controls the general operation of the control system 124.

The memory 132 can be any type of suitable memory. For example, the memory 132 comprises a non-transitory computer readable storage medium. In certain examples, the memory 132 is located on and/or co-located on the same computer chip as the processor 130. In the depicted embodiment, the memory 132 stores the above-referenced program 134 along with one or more stored values 136 (e.g., stored sensor data values, in certain embodiments).

Also as depicted in FIG. 1, in various embodiments, the secondary device 112 is disposed within the mobile platform 110. For example, in certain embodiments, the secondary device 112 belongs to a user of the mobile platform 110, and is movably disposed within the mobile platform 110 at certain times (such as when the user is disposed inside the mobile platform 110). Also in various embodiments, the secondary device 112 comprises a representative one of a number of secondary devices (e.g., each belonging to a respective user of a respective mobile platform 110 of the fleet, group, or set of mobile platforms from which data is collected).

In certain embodiments, the secondary device 112 comprises a mobile phone, such as a smart phone. However, in various embodiments, the secondary device 112 may also comprise any number of other types of electronic devices such as, by way of example only: tablets, laptop computers, smart watches and other wearable devices, and various other types of electronic devices.

In various embodiments, the secondary device 112 includes functionality (e.g., with built-in sensors) to collect data as to mobile platform events that are similar to or correspond to the mobile platform events pertaining to the sensor data collected by the sensors 126 of the mobile platform 110. Also in various embodiments, the secondary device 112 independently collects data as to these mobile platform events, and transmits the secondary device data for processing. For example, in certain embodiments, the secondary device 112 transmits the secondary device data via one or more wireless communications networks 116 to the remote server 114 for processing, including for correlation with the mobile platform data from the mobile platform 110.

In various embodiments, the remote server 114 communicates with mobile platforms (such as the representative mobile platform 110 of FIG. 1) and secondary devices (such as the representative secondary device 112 of FIG. 1) via the one or more wireless communications networks 116. In various embodiments, the remote server 114 obtains mobile platform data from a number of different mobile platforms 110 and secondary device data from a number of different secondary devices 112, and correlates the mobile platform data with the secondary device data. In various embodiments, the remote server 114 performs these functions in accordance with the process and implementations as set forth in FIGS. 2-9 and described in greater detail further below in connection therewith.

As depicted in FIG. 1, in various embodiments the remote server 114 includes a transceiver 138, a processor 140, and a memory 142.

In various embodiments, the transceiver 138 is utilized to communicate with the mobile platforms 110 (and other mobile platforms) and the secondary devices 112. In various embodiments, the transceiver 138 receives the mobile platform data from the mobile platforms 110, and also receives the secondary device data from the secondary devices 112.

Also in various embodiments, the processor 140 performs the computation and control functions of the remote server 114, and may comprise any type of processor or multiple processors, single integrated circuits such as a microprocessor, or any suitable number of integrated circuit devices and/or circuit boards working in cooperation to accomplish the functions of a processing unit. During operation, the processor 140 executes one or more programs 144 contained within the memory 142 and, as such, controls the general operation of the remote server 114.

The memory 142 can be any type of suitable memory. For example, the memory 142 comprises a non-transitory computer readable storage medium. In certain examples, the memory 142 is located on and/or co-located on the same computer chip as the processor 140. In the depicted embodiment, the memory 142 stores the above-referenced program 144 along with one or more stored values 146 (e.g., stored mobile platform data values and stored secondary device data values, in certain embodiments).

Figure 2:
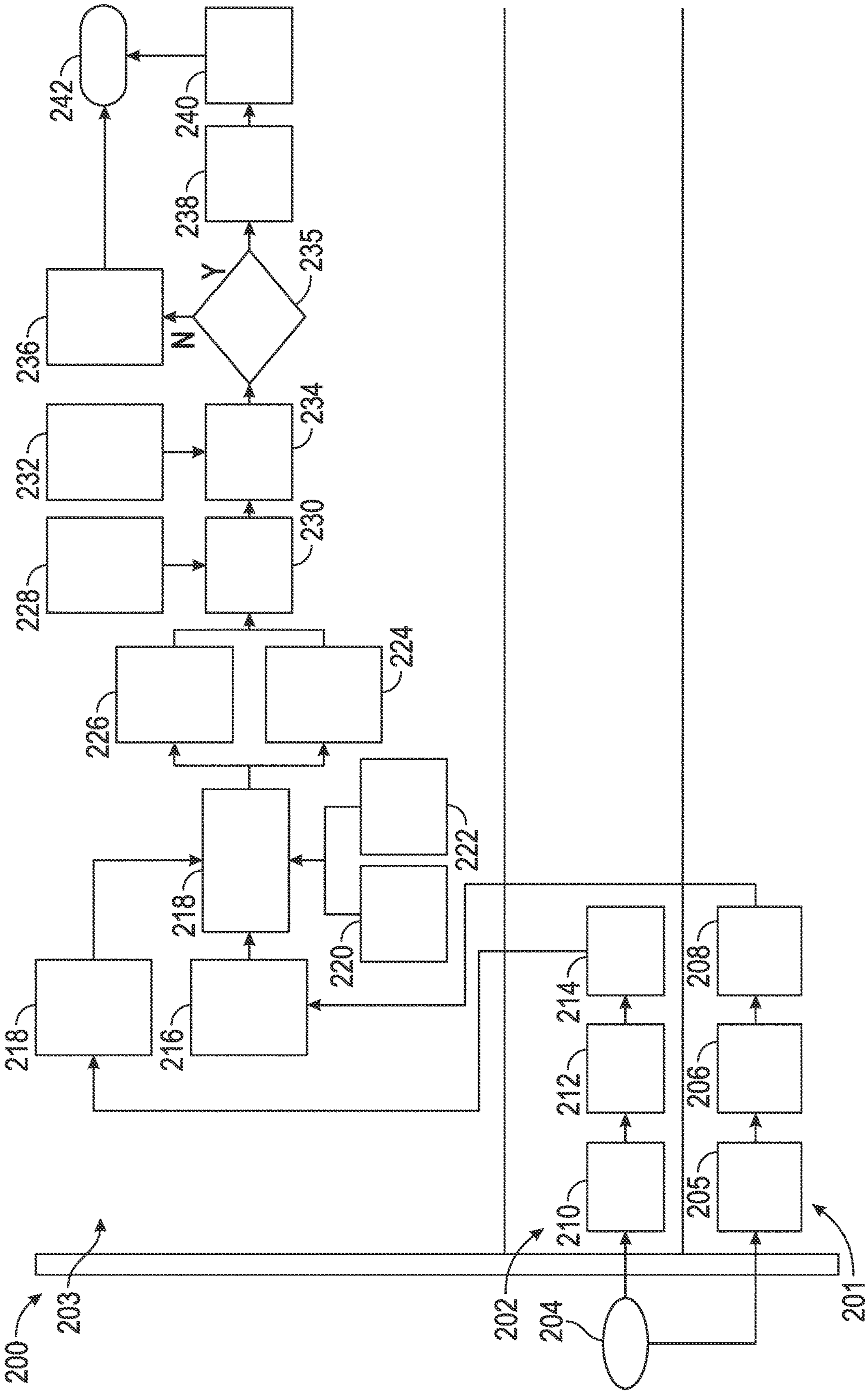
FIG. 2 is a flowchart of a process correlating data obtained from mobile platforms with data obtained from secondary devices inside mobile platforms, and that can be implemented in connection with the system of FIG. 1, in accordance with exemplary embodiments.

With reference now to FIG. 2, a flowchart is provided of a method 200 for correlating data of mobile platforms (e.g., vehicles and/or other mobile platforms) with data of secondary devices that are temporarily disposed within mobile platforms, in accordance with exemplary embodiments. In accordance with various embodiments, the method 200 can be implemented in connection with the system 100 of FIG. 1, including the mobile platform 110, the secondary device 112, the remote server 114, and the components thereof. In addition, the method 200 is also described below in connection with FIGS. 3-9, which depict exemplary implementations thereof in accordance with exemplary embodiments.

As depicted in FIG. 2, in certain embodiments, the method 200 includes certain steps performed by the mobile platform 110 (referred to as a first grouping 201 of steps); certain other steps performed by the secondary device 112 (referred to as a second grouping 202 of steps); and certain other steps performed by the remote server 114 (referred to as a third grouping 203 of steps). It will be appreciated that this may vary in other embodiments. It will also be appreciated that the order of performance of the steps need not be determined by the grouping as set forth above.

With continued reference to FIG. 2, in various embodiments the method 200 begins at 204. In various embodiments, the method 200 begins when a mobile platform (such as the mobile platform 110 of FIG. 1) is operating, such as when a mobile platform trip (e.g., a current mobile platform drive or ignition cycle) begins on a roadway with one or more secondary devices (such as the secondary device 112 of FIG. 1) disposed inside the mobile platform.

In various embodiments, the mobile platform detects the beginning of the trip (step 205). In various embodiments, this is performed via one or more sensors 126 of the mobile platform 110.

Also in various embodiments, mobile platform data is generated (step 206). Specifically, in various embodiments, sensor data is obtained from the mobile platform sensors 126 throughout the duration of the trip. In various embodiments, the sensor data (also referred to herein as mobile platform data) includes the following, among other potential types of data: speed, acceleration, deceleration, braking, turning, and mobile platform events (e.g., changes in any of the above values, and/or contact with another mobile platform or object, and/or any number of other types of mobile platform events). In various embodiments, the sensor data may be obtained by the following sensors 126, among various other possible sensors 126 of the mobile platform 110: location sensors (e.g., GPS sensors), gyroscopes, speed sensors (e.g., wheel speed sensors), accelerometers, braking sensors (e.g., coupled to a brake pedal or braking system of the mobile platform 110), steering sensors (e.g., steering angle sensors coupled to a steering wheel or steering column of the mobile platform 110), and/or other sensors configured to collect sensor data from the mobile platform 110.

While in various embodiments the mobile platform data (and detecting of the mobile platform trip) of steps 205 and 206 originate from mobile platform sensors 126 as described above (e.g., that are built into the mobile platform), in certain other embodiments the mobile platform data may also originate from one or more additional secondary devices 112 onboard the mobile platform 110 (e.g., different from the secondary device 112 associated with steps 210 and 212 described below) and/or that are configured to detect mobile platform events, collect sensor data during operation of the mobile platform, or both.

Also in various embodiments, the mobile platform data is transmitted (step 208). In various embodiments, the sensor data of step 206 is transmitted from the mobile platform 110 to the remote server 114 via the transceiver 128 of the mobile platform 110 using one or more wireless communications networks 116 of FIG. 1, and is received by the remote server 114 via the transceiver 138 thereof.

In various embodiments, each of the above-described steps 205, 206, and 208 are performed by the mobile platform 110, thus corresponding to the first grouping 201 of steps as defined above and depicted in FIG. 2.

In addition, in various embodiments, the secondary device detects the beginning of the trip (step 210). In various embodiments, this is performed via the secondary device 112 of FIG. 1 (e.g., via one or more non-depicted, embedded sensors thereof).

Also in various embodiments, secondary device data is generated (step 212). Specifically, in various embodiments, secondary device data is obtained via the secondary device 112 throughout the duration of the trip. In various embodiments, the secondary device data of step 212 includes data as to a number of identical or similar parameters and events as the mobile platform data of step 206; however, in various embodiments certain of the parameters and/or events may differ with the secondary device data as compared with the mobile platform data. Also in various embodiments, certain of the parameters and/or events may be collected at different points in time with respect to the secondary device data as compared with the mobile platform data, and so on.

Also in various embodiments, the secondary device data is transmitted (step 214). In various embodiments, the secondary device data of step 212 is transmitted from the secondary device 112 to the remote server 114 using one or more wireless communications networks 116 of FIG. 1.

In various embodiments, each of the above-described steps 210, 212, and 214 are performed by the secondary device 112, thus corresponding to the second grouping 202 of steps as defined above and depicted in FIG. 2.

In certain embodiments, the remaining steps of the method described below (namely, steps 216-242) are performed by the remote server 114, thus corresponding to the third grouping 203 of steps as depicted in FIG. 2.

In various embodiments, the mobile platform data is stored (step 216). Specifically, in various embodiments, the mobile platform data of step 206 is stored in the memory 142 of FIG. 1 as stored values 146 thereof.

Also in various embodiments, the secondary device data is stored (step 218). Specifically, in various embodiments, the secondary device data of step 212 is stored in the memory 142 of FIG. 1 as stored values 146 thereof.

Also in various embodiments, pre-filtering is applied (step 218). Specifically, in various embodiments, pre-filtering is applied to both the mobile platform data and the secondary device data in order to reduce the search space for correlating the mobile platform data with the secondary device data. For example, in various embodiments, this prevents comparing every mobile platform trip data set to every device trip data set, but rather restricts the comparisons to respective data sets that could be feasible or compatible with one another. In various embodiments, the pre-filtering is applied via a processor, such as the processor 140 of the remote server 114 of FIG. 1.

In addition, in certain embodiments, the pre-filtering of step 218 also incorporates localized geo-hashed spaces (step 220) as well as time-hashing for start and end times (step 222). In certain embodiments, the geo-hashing of step 220 and the time-hashing of step 222 are performed prior to step 218, and are then utilized as part of the pre-filtering. In certain other embodiments, the geo-hashing and the time-hashing may be performed as part of step 218. In various embodiments, the geo-hashing and the time-hashing are performed via a processor, such as the processor 140 of the remote server 114 of FIG. 1.

In various embodiments, after the pre-filtering of step 218, a mobile platform event sequence is generated (step 224). Specifically, in various embodiments, the mobile platform data, as filtered during step 218 (and in certain embodiments, also during steps 220 and 222), is utilized in generating a mobile platform event sequence based on the mobile platform data. In various embodiments, the mobile platform event sequence is generated via a processor, such as the processor 140 of the remote server 114 of FIG. 1. Also in certain embodiments, the mobile platform event sequence is represented as follows: $V=\{A(t_1), B(t_2), C(t_3), D(t_4), E(t_5)\}$, in which "V" represents the mobile platform event sequence, "A" represents a first event detected at time "$t_1$", "B" represents a second event detected at time "$t_2$", "C" represents a third event detected at time "$t_3$", "D" represents a fourth event detected at time "$t_4$", and "E" represents a fifth event detected at time "$t_5$", and so on. It will be appreciated that this can be extended for any number of detected events at any number of different points in time.

In addition, as used herein, the term "events" refers to any number of mobile platform events, such as hard braking, hard acceleration, hard turn, speed events (e.g., speed transitions), other speed and acceleration events, mobile platform contact events, and so on, for example with respect to both the mobile platform event sequences (discussed above), the secondary device event sequences (discussed below), and the analysis and comparisons thereof (for example, as described further below).

Also in various embodiments, after the pre-filtering of step 218, a secondary device event sequence is generated (step 226). Specifically, in various embodiments, the secondary device data, as filtered during step 218 (and in certain embodiments, also during steps 220 and 222), is utilized in generating a secondary device event sequence based on the secondary device data. In various embodiments, the secondary device event sequence is generated via a processor, such as the processor 140 of the remote server 114 of FIG. 1. Also in certain embodiments, the secondary event sequence is represented as follows: $P=\{B(t_2+delta), D(t_4+delta), F(t_5+delta)\}$, in which "P" represents the secondary event sequence, "B", "D", and "F" represent detected events, the "t" values represent points in time, and the "delta" values represent changes in the respective times of detection of events by the secondary device 112 as compared with the detection of the events by the mobile platform 110.

In various embodiments, the method utilizes the following assumptions: (i) the mobile platform 110 does not necessarily detect each of the events detected by the secondary device 112; (ii) the secondary device 112 does not necessarily detect each of the events detected by the mobile platform 110; (iii) the mobile platform 110 and the secondary device 112 are not necessarily synched in time; and (iv) each point in time "t" (e.g., equal to one second, in an exemplary embodiment) contains either an event (i.e., "1") or no event (i.e., "0"). Accordingly, in this exemplary embodiment the mobile platform 110 and the secondary device 112 may detect common events (e.g., events "B" and "D"), but not at precisely the same time.

Figure 3:
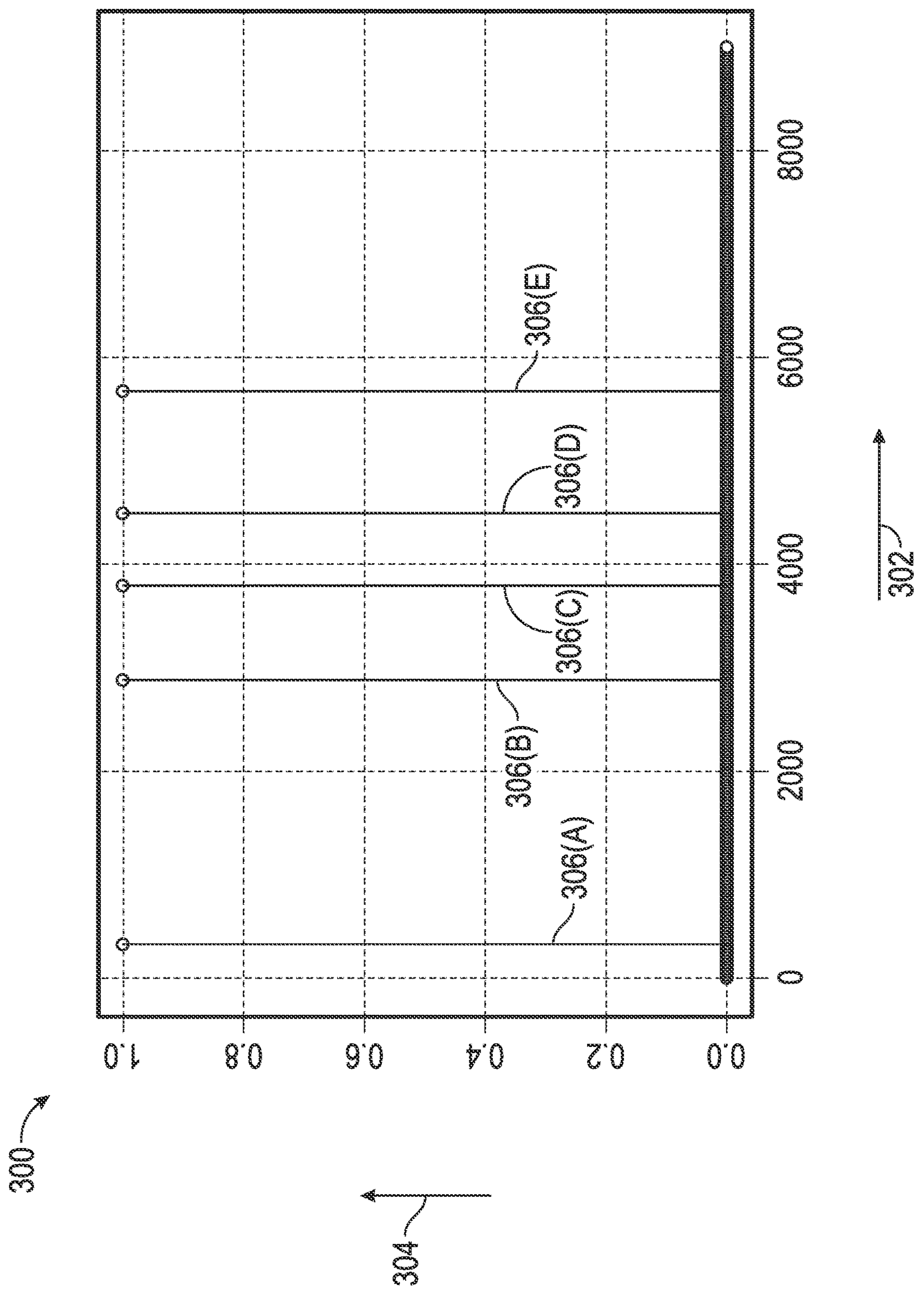
FIGS. 3-9 provide representative illustrations that depict exemplary implementations of the process of FIG. 2, in accordance with exemplary embodiments.
Figure 6:
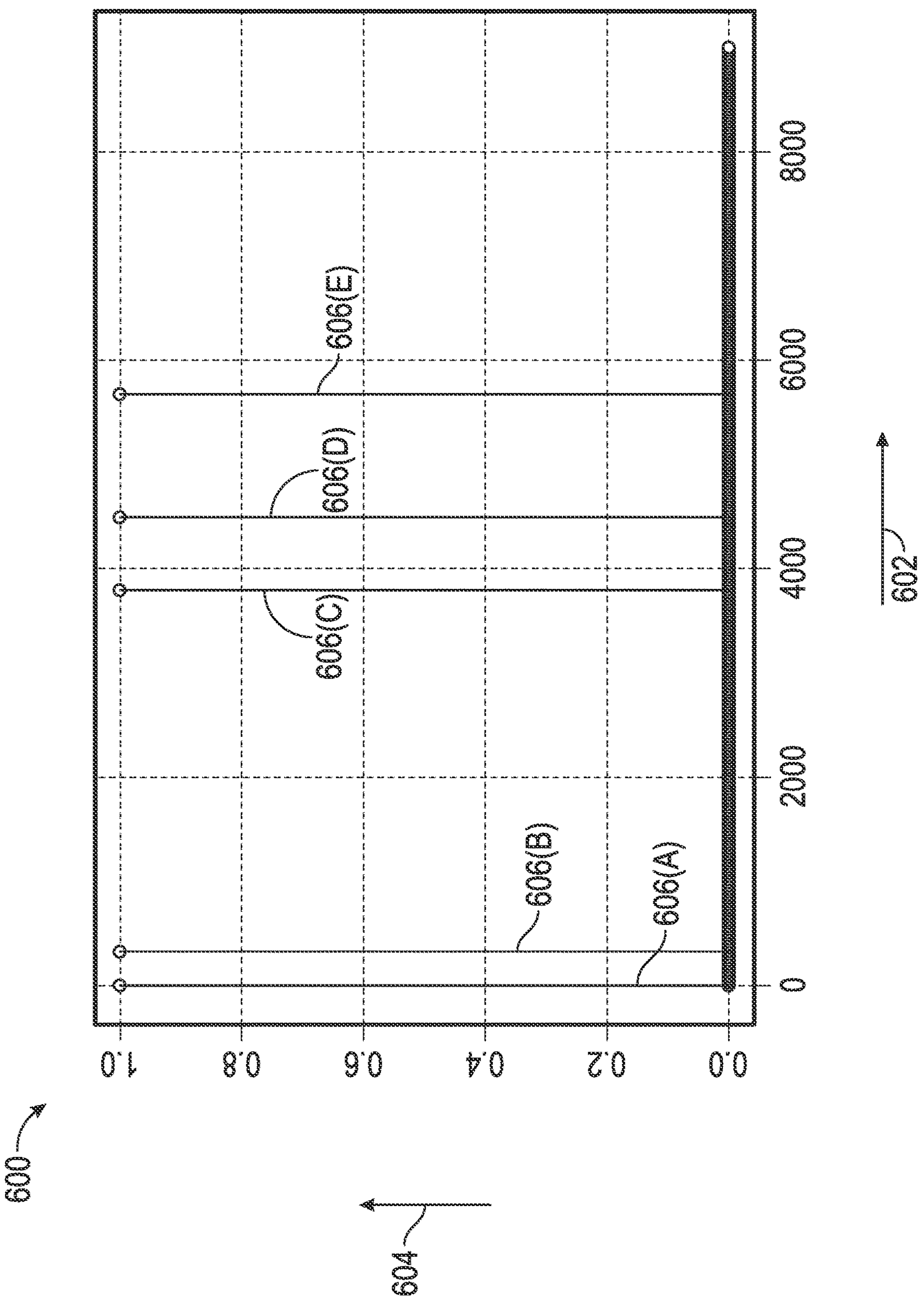
Figure 7:
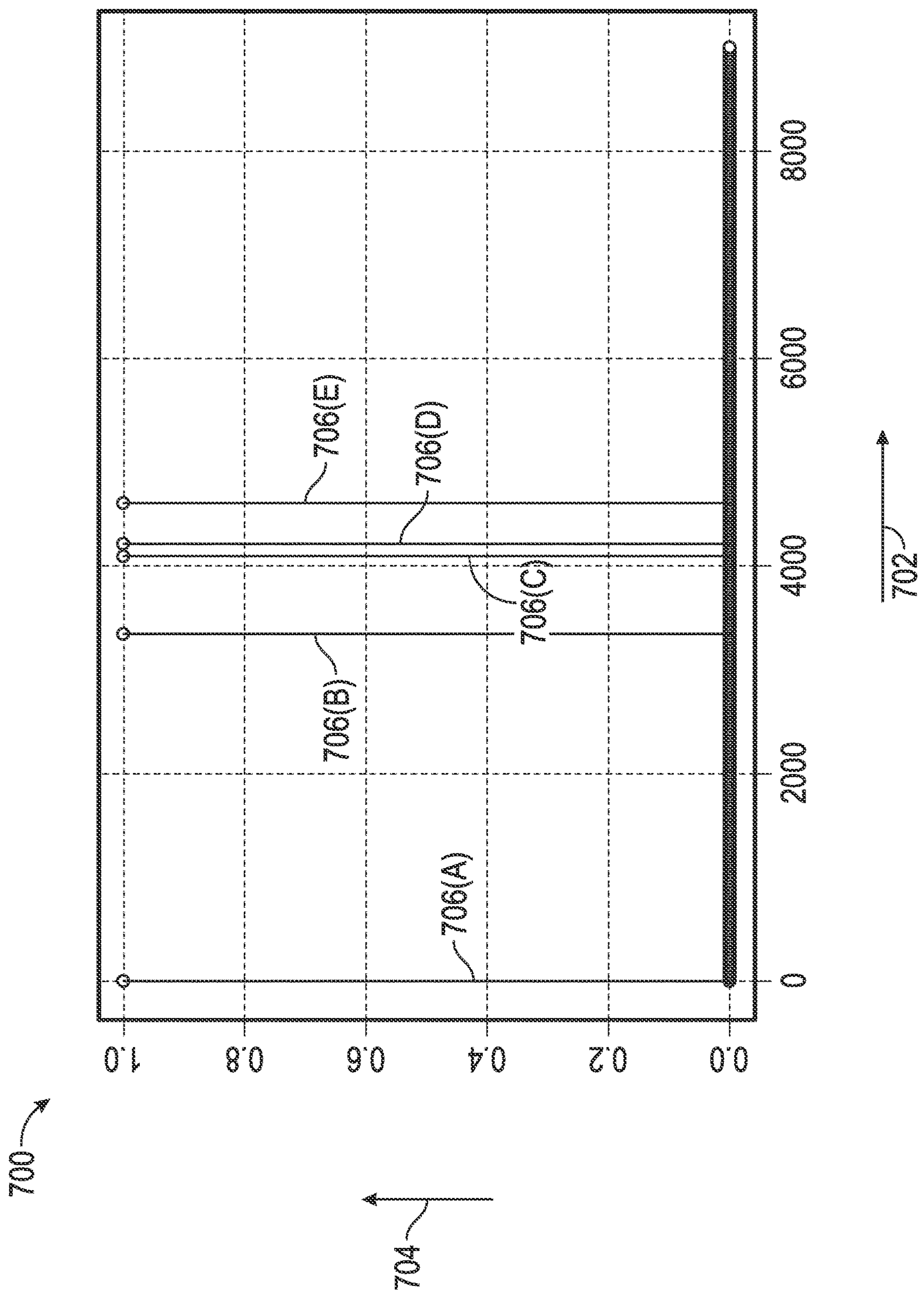

With reference to FIGS. 3, 6, and 7, exemplary illustrations are provided as to the event spaces of steps 224 and 226, in accordance with exemplary embodiments. Specifically, in accordance with various embodiments: (i) FIG. 3 depicts an exemplary secondary device sequence (corresponding to step 226); (ii) FIG. 6 depicts a first exemplary mobile platform sequence for a first mobile platform (corresponding to step 224); and (iii) FIG. 7 depicts a second exemplary mobile platform sequence for a second mobile platform (also corresponding to step 224).

First, FIG. 3 depicts an illustration of a secondary device event sequence 300, in accordance with an exemplary embodiment. As depicted in FIG. 3, the illustration includes an x-axis 302 corresponding to time (in seconds), and a y-axis 304 corresponding to an event indicator (e.g., being equal to zero (0) for no event, and being equal to one (1) for an event). As illustrated in FIG. 3, in an exemplary embodiment five events are detected by the secondary device 112 at different points in time, including events 306(A), 306(B), 306(C), 306(D), and 306(E).

Next, FIG. 6 depicts an illustration of a mobile platform event sequence 600 for a first mobile platform 110, in accordance with an exemplary embodiment. As depicted in FIG. 6, the illustration includes an x-axis 602 corresponding to time (in seconds), and a y-axis 604 corresponding to an event indicator (e.g., being equal to zero (0) for no event, and being equal to one (1) for an event). As illustrated in FIG. 6, in an exemplary embodiment five events are detected by the first mobile platform 110 at different points in time, including events 606(A), 606(B), 606(C), 606(D), and 606(E).

FIG. 7 depicts an illustration of a mobile platform event sequence 700 for a first mobile platform 110, in accordance with an exemplary embodiment. As depicted in FIG. 7, the illustration includes an x-axis 702 corresponding to time (in seconds), and a y-axis 704 corresponding to an event indicator (e.g., being equal to zero (0) for no event, and being equal to one (1) for an event). As illustrated in FIG. 7, in an exemplary embodiment five events are detected by the second mobile platform 110 at different points in time, including events 706(A), 706(B), 706(C), 706(D), and 706(E).

With reference back to FIG. 2, in various embodiments filtering is performed (step 230). In various embodiments, filtering is performed for the mobile platform event sequence of step 224, the secondary device event sequence of step 226, or both. In various embodiments, the filtering is performed by one or more processors, such as the processor 140 of FIG. 1.

In certain embodiments, DSP (Digital Signal Processing) convolution is applied to the secondary device event sequence, either as part of step 230 and/or as part of a separate pre-filtering step 228. In various embodiments, processor 140 applies the DSP convolution to the secondary device event sequence so as to effectively "smear" the events in time.

Figure 4:
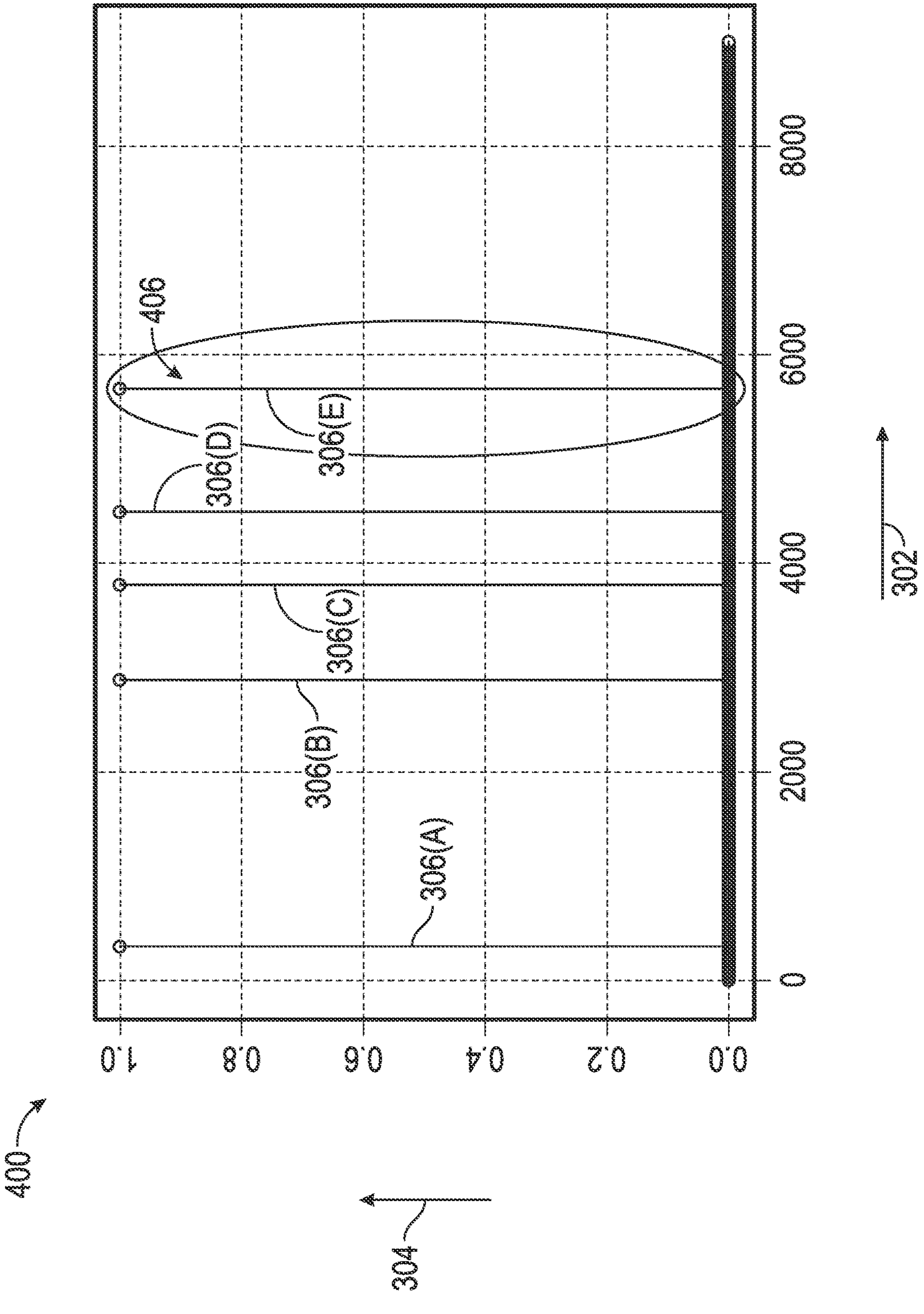
Figure 5:
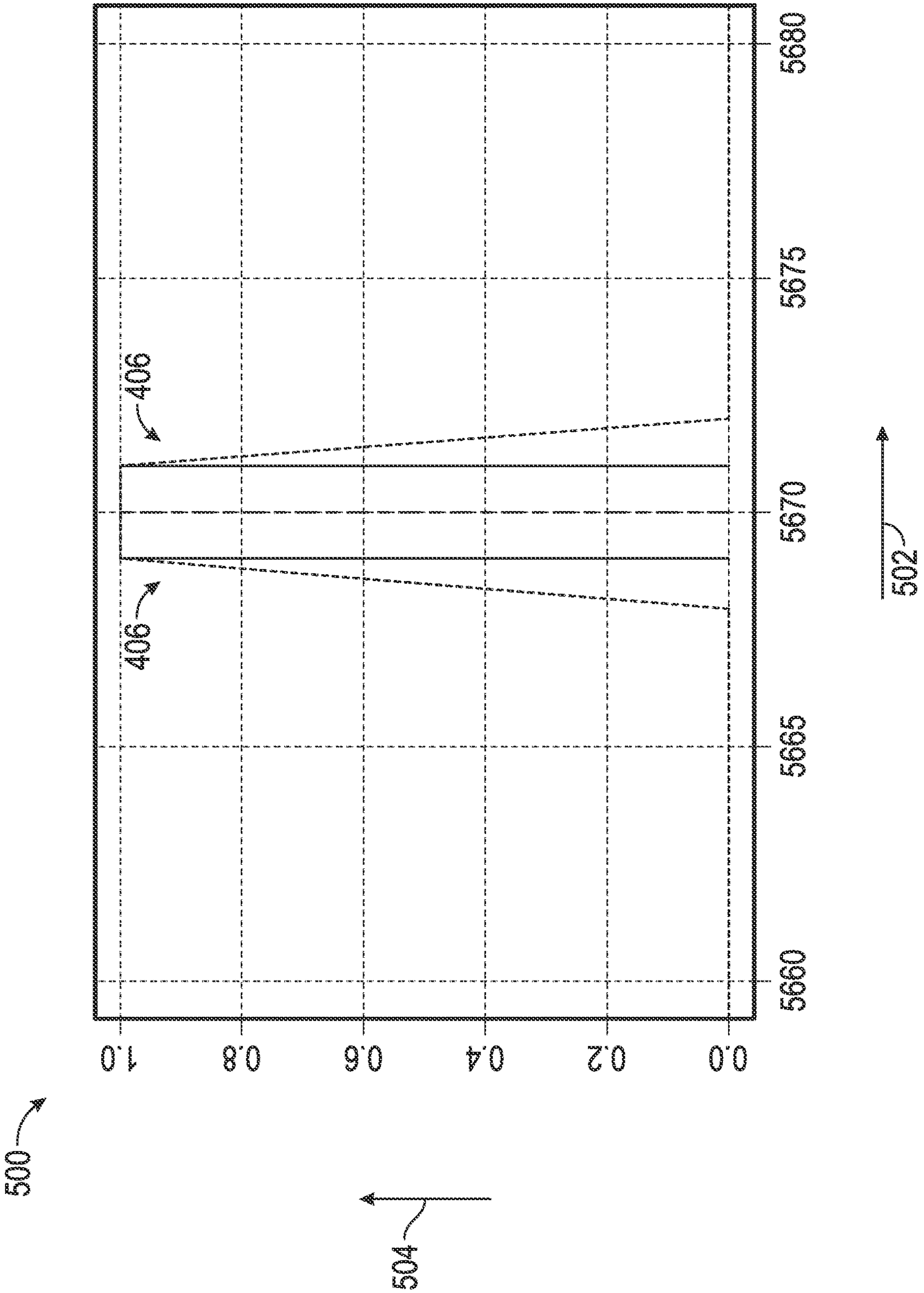

With reference to FIGS. 4 and 5, an exemplary implementation if provided for the application of the DSP convolution to the second device event sequence 300 of FIG. 3. First, as depicted in FIG. 4 with illustration 400, one of the events (namely Event "306(E)") of FIG. 3 is selected as a selected event 406 for application of the DSP convolution for illustrative purposes.

Next, with reference to FIG. 5, an illustration 500 is provided for the application of the DSP convolution to the selected event 406. Specifically, the illustration 500 includes an x-axis 502 that represents time (in seconds), but with an elongated focus on a particular time interval associated with the selected event 406. Also as depicted in FIG. 5, the y-axis 504 corresponds to the event indicator, similar to the discussion above with respect to FIG. 3. As illustrated in FIG. 5, the application of the DSP convolution (and the elongated time focus on the x-axis 502) broadens the event 406 for purposes of examination and analysis. In various embodiments, this is performed for each of the detected events 306 of FIG. 3, thereby broadening each event in time, so as to permit "fuzzy" time comparisons for the events.

With reference back to FIG. 2, in various embodiments signal correlation is performed (step 234). In various embodiments, a signal correlation is provided between the secondary device event spaces and the mobile platform event spaces. In various embodiments, this is performed by one or more processors, such as the processor 140 of FIG. 1.

In certain embodiments, DSP cross-correlations are applied between the various mobile platform event spaces and the various secondary device event spaces (e.g., after the filtering of steps 228 and/or 230 is performed). In various embodiments, the processor 140 performs the DSP cross-correlations for each of the mobile platform event sequences with respect to each of the secondary device event sequences. Also in various embodiments, the processor 140 provides a pairwise cross-correlation of the secondary device event sequences and the mobile platform event sequences. In certain embodiments, the DSP cross-correlations are performed as part of step 234; whereas in certain embodiments the DSP cross-correlations may be part of a separate step 232 as illustrated in FIG. 2.

Figure 8:
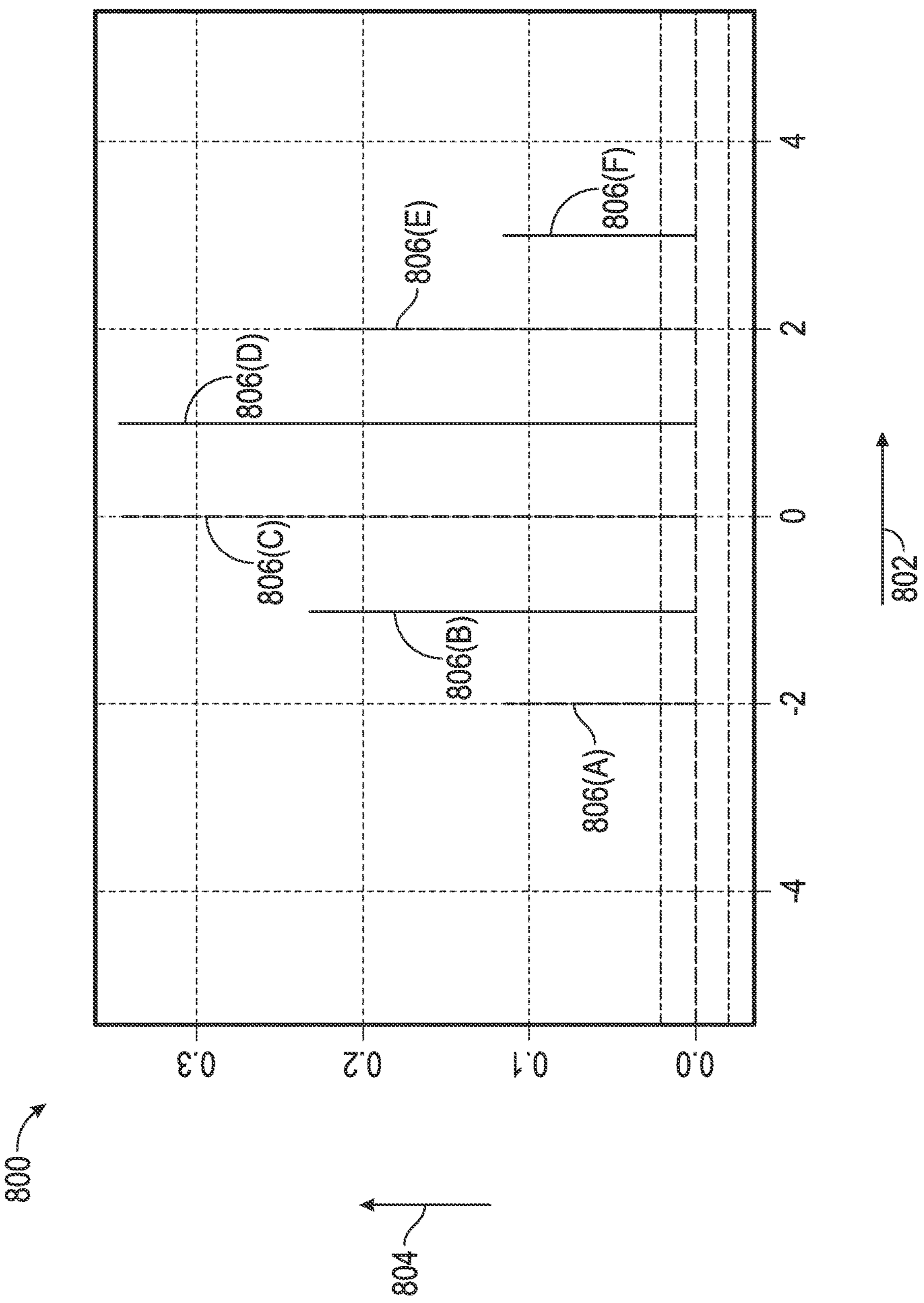
Figure 9:
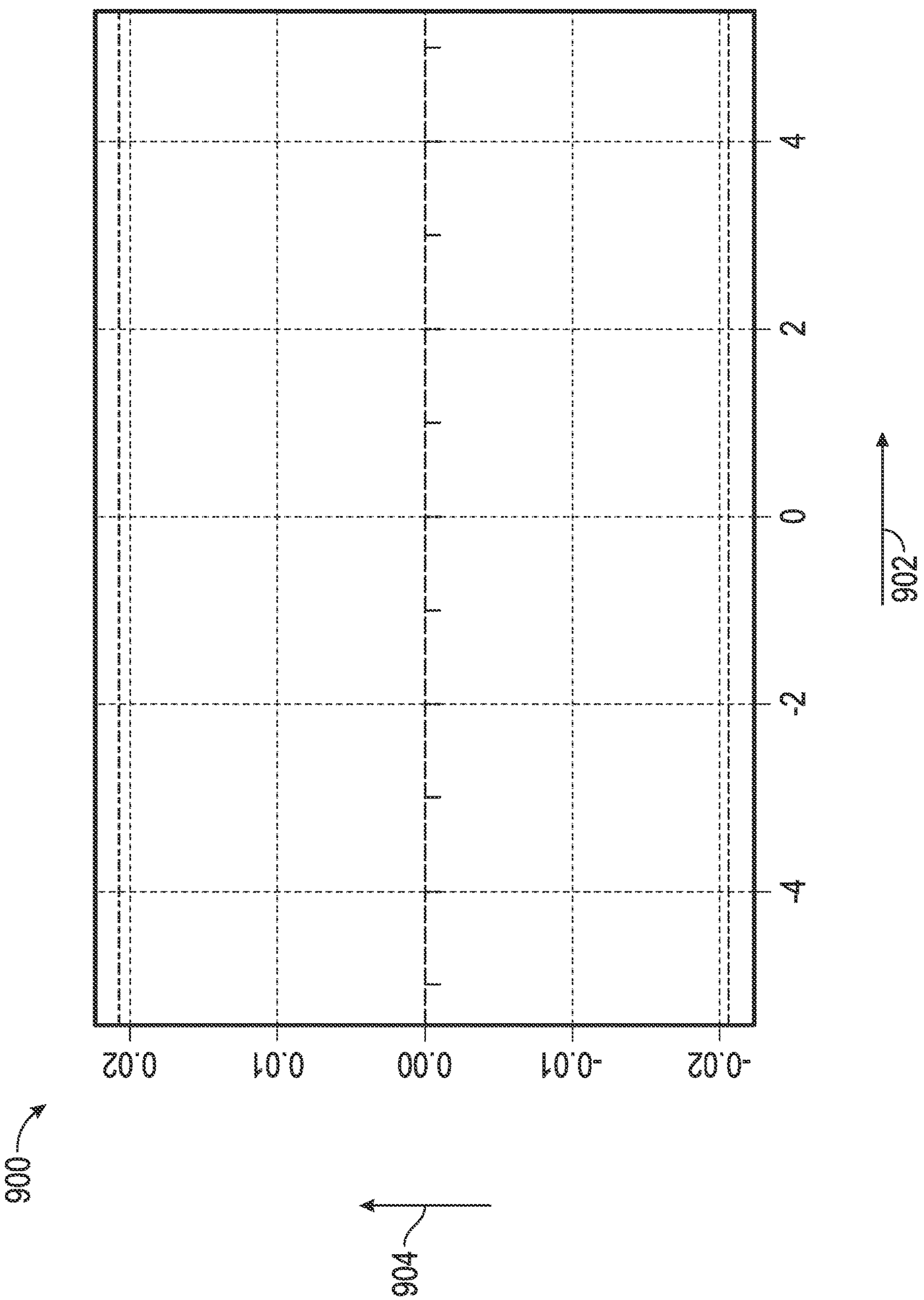

With reference to FIGS. 8 and 9, exemplary implementations are provided for the signal correlations of step 234 (and including the cross-correlation of step 232) of the secondary device event sequence of the secondary device 112 with the mobile platform event sequences of two difference mobile platforms 110, in accordance with exemplary embodiments. Specifically: (i) FIG. 8 depicts an exemplary cross-correlation between the secondary device event sequence of FIG. 3 (as filtered in FIGS. 4 and 5) with the mobile platform event sequence of the first mobile platform of FIG. 6; and (ii) FIG. 9 depicts an exemplary cross-correlation between the secondary device event sequence of FIG. 3 (as filtered in FIGS. 4 and 5) with the mobile platform event sequence of the second mobile platform of FIG. 7.

First, in FIG. 8, an illustration 800 is provided as to the cross-correlation of the secondary device event sequence (of FIGS. 3-5) with the first mobile platform (of FIG. 6). As depicted in FIG. 8, the cross-correlation illustration 800 includes an x-axis 802 corresponding to a time lag between the event recognition of the secondary device versus the first mobile platform (e.g., in seconds), and a y-axis 804 represents an autocorrelation function (ACF) for the cross-correlation. As illustrated in FIG. 8, in this particular example, there are measurable and significant correlations between various detected events 806(A), 806(B), 806(C), 806(D), 806(E), and 806(F), with various different time lags associated therewith (e.g., corresponding to differences in time for the detection of the events by the secondary device 112 versus the detection by the first mobile platform 110). As depicted in FIG. 8, in this exemplary embodiment, there are significant correlations with the respective detected events within a predetermined time lag threshold (e.g., plus or minus two seconds, in an exemplary embodiment). Accordingly, in various embodiments, this would serve as an indication that the secondary device 112 has indeed been disposed within the first mobile platform 110.

Next, as illustrated in FIG. 9, an illustration 900 is provided as to the cross-correlation of the secondary device event sequence (of FIGS. 3-5) with the second mobile platform (of FIG. 7). As depicted in FIG. 9, the cross-correlation illustration 900 similarly includes an x-axis 902 corresponding to a time lag between the event recognition of the secondary device versus the second mobile platform (e.g., in seconds), and a y-axis 904 represents an autocorrelation function (ACF) for the cross-correlation. As illustrated in FIG. 9, in this particular example, there are no significant correlations between various detected events of the secondary device 112 with the second mobile platform 110. Accordingly, in various embodiments, this would serve as an indication that the secondary device 112 has not been disposed within the second mobile platform 110.

With reference again back to FIG. 2, in various embodiments a determination is made at step 235 as to whether one or more strong correlations exist between the signal correlations of step 234 (e.g., with respect to the DSP cross-correlations of step 232). Specifically, in various embodiments, during step 235, a processor (such as the processor 140 of FIG. 1) determines whether a measure of correlation (such as the ACF referenced above with respect to FIGS. 8 and 9) is greater than a predetermined threshold (e.g., as stored in the memory 142 of FIG. 1 as a stored value 146 thereof) for each comparison between respective secondary device event sequences and mobile platform event sequences.

In various embodiments, if it is determined in step 235 that a strong correlation does not exist for a particular comparison, then it is determined in step 236 that no association is made between the particular secondary device and the particular mobile platform associated with the comparison. Specifically, in this case, in various embodiments it is determined that the secondary device currently under examination is not likely to have been disposed inside the mobile platform currently under examination (e.g., similar to the example of FIG. 9 as described above). In various embodiments, this determination is made by a processor, such as the processor 140 of FIG. 1. In various embodiments, the method 200 then terminates at step 242.

Conversely, in various embodiments, if it is instead determined in step 235 that a strong correlation does exist for a particular comparison, then an association is made between the between the particular secondary device and the particular mobile platform associated with the comparison (step 238). Specifically, in this case, in various embodiments a probabilistic assignment matrix is created between the mobile platform and device data, and it is determined that the secondary device currently under examination is likely to have been disposed inside the mobile platform currently under examination (e.g., similar to the example of FIG. 8 as described above). In various embodiments, this association is made by a processor, such as the processor 140 of FIG. 1.

In various embodiments, one or more other actions may also be taken (step 240). For example, in certain embodiments, the secondary device 112 may be linked to the mobile platform 110, for example for the purposes of collecting and analyzing future data, and/or for providing future reporting and/or information to the user of the secondary device 112 and the mobile platform 110, and so on. Also in certain embodiments, mobile platform registration records may be updated accordingly. For example, in certain embodiments, when a particular mobile platform 110 is now associated with a secondary device 112 of anew (or different user), the mobile platform registration records may be updated accordingly to reflect the new user (or owner), and/or an inquiry may be sent to the user of the secondary device 112 to confirm ownership of the mobile platform 110, and so on. In certain embodiments, such actions may be taken in whole or in part in accordance with instructions provided by a processor, such as the processor 140 of FIG. 1.

In various embodiments, the method 200 then terminates at step 242.

Accordingly, in various embodiments, methods and systems are provided for correlating data obtained from mobile platforms (e.g., vehicles and/or other mobile platforms) with data obtained from secondary devices that may be disposed inside the mobile platforms and/or that are otherwise configured to detect mobile platform events, collect sensor data during operation of the mobile platform, or both. In various embodiments, separate event sequences are generated independently for the different secondary devices and mobile platforms, and are then cross-correlated together (e.g., via a processor at a remote server) in accordance with the steps of the method 200 of FIG. 2 and the implementations of FIGS. 3-9 described above, and using the system 100 as described above. In various embodiments, the correlation between the mobile platforms and the secondary devices (and their respective data and event sequences) are independent from, and do not rely upon any prior association, linking, or communication between the mobile platforms and the secondary devices. Rather, in various embodiments, the data correlation is based on independent collection of data from the mobile platforms and secondary devices and subsequent analysis, examination, and treatment thereof.

In addition, similar to the note above, while in various embodiments the correlations herein are between (a) mobile platform data from built-in sensors of the mobile platform 110 and (b) secondary devices onboard the mobile platform, it will be appreciated that in certain other embodiments the correlations may be instead between multiple secondary devices onboard the mobile platform 110 (e.g., in which the "mobile platform data" may comprise data from an additional secondary device onboard the mobile platform 110), and so on.

It will be appreciated that the systems, mobile platforms, methods, and implementations may vary from those depicted in the Figures and described herein. For example, the system 100 of FIG. 1, including the mobile platform 110, the secondary device 112, the remote server 114, and components thereof may differ from that depicted in FIG. 1 and described above. It will similarly be appreciated that the steps of the method 200 of FIG. 2 and the implementations of FIGS. 3-9 may differ from those depicted in the Figures and as described above, and/or that various steps may occur concurrently and/or in a different order than that depicted in the Figures and as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining mobile platform data, the mobile platform data pertaining to a mobile platform;

obtaining secondary device data, the secondary device data originating from a secondary device that is movably disposed within the mobile platform at certain times, wherein the obtaining of the secondary device data is independent from the obtaining of the mobile platform data; and correlating the mobile platform data with the secondary device data, via a processor of a remote server that is remote from both the mobile platform and the secondary device, including by:

generating, via the processor, a mobile platform event space for the mobile platform data;

generating, via the processor, a secondary device event space for the secondary device data;

performing, via the processor, a cross-correlation between the mobile platform event space and the secondary device event space; and applying, via the processor, a preliminary limitation on a search space for the mobile platform event space and the secondary device event space prior to performing the cross-correlation, including by performing pre-filtering to both the mobile platform data and the secondary device data in order to reduce the search space for correlating the mobile platform data with the secondary device data that restricts the comparisons to respective data sets of mobile platform trip data sets with respective device trip data set that could be feasible or compatible with one another, the pre-filtering incorporating localized geo-hashed spaces in addition to time-hashing for start and end times.

2. The method of claim 1, wherein the mobile platform data originates from one or more sensors that are built into the mobile platform.

3. The method of claim 1, wherein the mobile platform data originates from one or more additional devices that are configured to detect mobile platform events, collect sensor data during operation of the mobile platform, or both.

4. The method of claim 1, wherein the correlating of the mobile platform data with the secondary device data is performed via the processor without any prior association between the mobile platform and the secondary device.

5. The method of claim 1, wherein the step of performing the cross-correlation comprises:

performing, via the processor, a DSP convolution with respect to the secondary device event space, generating a filtered secondary device event space; and performing, via the processor, a DSP cross-correlation between the mobile platform event space and the filtered secondary device event space.

6. The method of claim 1, further comprising:

assigning, via the processor, a probabilistic likelihood as to whether the secondary device was disposed within the mobile platform based on the correlating of the mobile platform data with the secondary device data.

7. A system comprising:

a non-transitory computer readable storage medium that is configured to store:

mobile platform data, the mobile platform data pertaining to a mobile platform; and secondary device data, the secondary device data originating from a secondary device that is movably disposed within the mobile platform at certain times, wherein the mobile platform data was obtained separately from the secondary device data; and a processor that is coupled to the non-transitory computer readable storage medium and that is configured to at least facilitate correlating the mobile platform data with the secondary device data, including by:

generating a mobile platform event space for the mobile platform data;

generating a secondary device event space for the secondary device data;

performing a cross-correlation between the mobile platform event space and the secondary device event space; and applying a preliminary limitation on a search space for the mobile platform event space and the secondary device event space prior to performing the cross-correlation, including by performing pre-filtering to both the mobile platform data and the secondary device data in order to reduce the search space for correlating the mobile platform data with the secondary device data that restricts the comparisons to respective data sets of mobile platform trip data sets with respective device trip data set that could be feasible or compatible with one another, the pre-filtering incorporating localized geo-hashed spaces in addition to time-hashing for start and end times.

8. The system of claim 7, wherein the mobile platform data originates from one or more sensors that are built into the mobile platform.

9. The system of claim 7, wherein the mobile platform data originates from one or more additional devices that are configured to detect mobile platform events, collect sensor data during operation of the mobile platform, or both.

10. The system of claim 7, wherein the processor is configured to at least facilitate correlating the mobile platform data with the secondary device data without any prior association between the mobile platform and the secondary device.

11. The system of claim 7, wherein the processor is further configured to at least facilitate:

performing a DSP convolution with respect to the secondary device event space, generating a filtered secondary device event space; and performing a DSP cross-correlation between the mobile platform event space and the filtered secondary device event space.

12. The system of claim 7, wherein the processor is further configured to at least facilitate assigning a probabilistic assignment matrix between the mobile platform data and the secondary device data based on the correlating of the mobile platform data with the secondary device data.

13. A system comprising:

a transceiver configured to at least facilitate:

obtaining mobile platform data pertaining to a mobile platform; and obtaining secondary device data from a secondary device that is remote from the system and that is movably disposed within the mobile platform at certain times, wherein the obtaining of the secondary device data is independent from the obtaining of the mobile platform data;

a non-transitory computer readable storage medium that is configured to store a program along with the mobile platform data and the secondary device data; and a processor that is coupled to both the transceiver and the non-transitory computer readable storage medium, and that is configured to execute the program and, in accordance with the program, to at least facilitate correlating the mobile platform data with the secondary device data, including by:

generating a mobile platform event space for the mobile platform data;

generating a secondary device event space for the secondary device data;

performing a cross-correlation between the mobile platform event space and the secondary device event space; and applying a preliminary limitation on a search space for the mobile platform event space and the secondary device event space prior to performing the cross-correlation, including by performing pre-filtering to both the mobile platform data and the secondary device data in order to reduce the search space for correlating the mobile platform data with the secondary device data that restricts the comparisons to respective data sets of mobile platform trip data sets with respective device trip data set that could be feasible or compatible with one another, the pre-filtering incorporating localized geo-hashed spaces in addition to time-hashing for start and end times.

14. The system of claim 13, wherein the mobile platform data originates from one or more sensors that are built into the mobile platform.

15. The system of claim 13, wherein the mobile platform data originates from one or more additional devices that are configured to detect mobile platform events, collect sensor data during operation of the mobile platform, or both.

16. The method of claim 1, wherein:

the mobile platform comprises a vehicle; and the secondary device comprises a mobile phone of a user of the vehicle.

17. The method of claim 1, further comprising, after the pre-filtering:

generating a mobile platform event sequence, via the processor of the remote server based on the mobile platform data, as to a plurality of events detected at a first plurality of points in time based on the mobile platform data, wherein each of the plurality of events pertains to a particular movement of the mobile platform;

generating a secondary device sequence, via the processor of the remote server, based on the secondary device data, as to the plurality of events detected at a second plurality of points in time based on the secondary device data; and determining, via the processor of the remote server, one or more respective distances between:

the first plurality of times corresponding to the plurality of events from the mobile platform event sequence; and the second plurality of times corresponding to the plurality of events from the secondary device event sequence;

wherein the cross-correlating is performed, via the processor of the remote server, based on the one or more respective differences.

18. The method of claim 17, wherein each of the plurality of events pertains to the particular movement of the mobile platform as evidence by changes in one or more of speed, acceleration, or steering parameters of the mobile platform exceeding a predetermined value.

19. The method of claim 17, wherein each of the plurality of events pertains to the particular movement of the mobile platform as evidence by contact of the mobile platform with another object.

20. The method of claim 17, further comprising:

assigning, via the processor of the remote server, a probabilistic likelihood that the secondary device was disposed within the mobile platform based on the cross-correlation, including based on the one or more respective differences between the first plurality of times corresponding to the plurality of events from the mobile platform event sequence and the second plurality of times corresponding to the plurality of events from the secondary device event sequence; and linking, via the processor of the remote server, the secondary device with the mobile platform, for collecting and analyzing future data and for providing future reporting and information to a user of the secondary device and the mobile platform, based on the probabilistic likelihood the secondary device was disposed within the mobile platform.

* * * * *